United States Patent
Huber et al.

(10) Patent No.: US 7,610,996 B2
(45) Date of Patent: Nov. 3, 2009

(54) MODULAR BRAKE ASSEMBLY FOR A DRIVE AXLE

(75) Inventors: Tilo Huber, Tiefenbach (DE); Stefan Reicheneder, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 347 days.

(21) Appl. No.: 11/716,755

(22) Filed: Mar. 12, 2007

(65) Prior Publication Data

US 2007/0219041 A1     Sep. 20, 2007

(30) Foreign Application Priority Data

Mar. 16, 2006   (DE) ................. 10 2006 012 065

(51) Int. Cl.
    *F16D 55/36*     (2006.01)
(52) U.S. Cl. ..................................... 188/71.5
(58) Field of Classification Search ............... 188/71.5, 188/72.1, 72.4; 192/70.12; 475/231, 240, 475/241
    See application file for complete search history.

(56) References Cited

U.S. PATENT DOCUMENTS

| 3,814,222 | A | * | 6/1974 | Koivunen | ................... 475/252 |
| 4,410,073 | A | | 10/1983 | Ehrlinger | |
| 2004/0116234 | A1 | * | 6/2004 | Han | .......................... 475/221 |
| 2006/0247087 | A1 | * | 11/2006 | Pontanari et al. | ............ 475/231 |

FOREIGN PATENT DOCUMENTS

| DE | 29 48 895 A1 | 6/1981 |
| DE | 198 46 667 A1 | 4/2000 |
| DE | 10 2005 037 559 A1 | 2/2007 |

* cited by examiner

*Primary Examiner*—Melanie Torres
(74) *Attorney, Agent, or Firm*—Davis & Bujold, P.L.L.C.

(57) ABSTRACT

A modular brake assembly for a drive axle is proposed, comprising a multi-disk brake with a service brake element and a parking brake element, which is disposed in a brake housing (1) with inside diameter between an axle bracket and axle center component. A guide fixed to the housing is provided on the inside diameter of the brake housing (1) for the actuating device (6) for a mechanical differential lock.

10 Claims, 2 Drawing Sheets

MODULAR BRAKE ASSEMBLY FOR A DRIVE AXLE

This application claims priority from German Application Serial No. 10 2006 012 065.5 filed Mar. 16, 2006.

FIELD OF THE INVENTION

The present invention relates to a modular brake assembly for a drive axle.

BACKGROUND OF THE INVENTION

Drive axles with integrated brake assemblies are known from the state of the art.

Today, it is necessary to complete an axle configured this way by integrating a mechanical differential lock with hydraulic actuation, wherein the standard configuration is supposed to exclude the mechanical differential lock.

Since, in addition to the service brake, a spring-actuated and hydraulically ventilated parking brake is provided in the brake assembly located in the axle; the installation space available for the actuating device of a mechanical differential lock is therefor disadvantageously limited.

It is the object of the present invention to provide a modular brake assembly for a standard configuration drive axle, wherein the actuating device for a mechanical differential lock can be integrated in the brake assembly. The design should be as simple as possible and the interfaces to structural components should remain unchanged. Furthermore, the material costs of the standard configuration are minimized.

SUMMARY OF THE INVENTION

According to the invention, a modular brake assembly for a drive axle is proposed, comprising a multi-disk brake with a service brake element and a parking brake element, which is located in a brake housing with inside diameter provided between an axle bracket and axle center component. On the inside diameter of the brake housing, a guide, fixed to the housing, is provided for the actuating device of a mechanical differential lock.

The brake assembly can be implemented without affecting the interfaces of the housing parts (screw assembly/centering between axle bracket and brake housing, as well as screw assembly/centering between brake housing and axle center housing), regardless of whether the drive axle comprises a mechanical differential lock.

The mechanical differential lock is preferably configured in accordance with DE 10 2005 037 559 A1, which is hereby incorporated by reference. It comprises a form-fit clutch, which can be actuated by displacing a sliding sleeve for opening or closing purposes, wherein the sliding sleeve can be operated against the force of a return spring by a co-axially configured piston.

According to the invention, the service brake piston is released by applying oil pressure in the parking brake oil circuit, thus releasing the provided multi-disk brake, wherein the actuation of the service brake is effected by applying oil pressure in the service brake circuit. This deflects the service brake piston and acts upon the brake disk assembly.

The parking brake is configured as a negative brake according to the invention. If pressure is reduced in the parking brake oil circuit, the parking brake piston, actuated by way of disk springs, acts upon the service brake piston, via axially displaceable pins, provided on the outer radius of the piston chamber and produces the required parking brake force. As a result of this configuration, a guide that is fixed to the housing can be implemented on the inside diameter of the brake housing for the actuating device of the mechanical differential lock, namely preferably a piston with integrated sliding sleeve, wherein the spring for returning the piston is likewise supported in this inside diameter. According to the invention, the oil supply line for the piston of the mechanical differential lock extends in the bridge between the parking and service brake pistons.

BRIEF DESCRIPTION OF THE DRAWINGS

The invention will now be described, by way of example, with reference to the accompanying drawings in which.

DETAILED DESCRIPTION OF THE INVENTION

Figure 1:
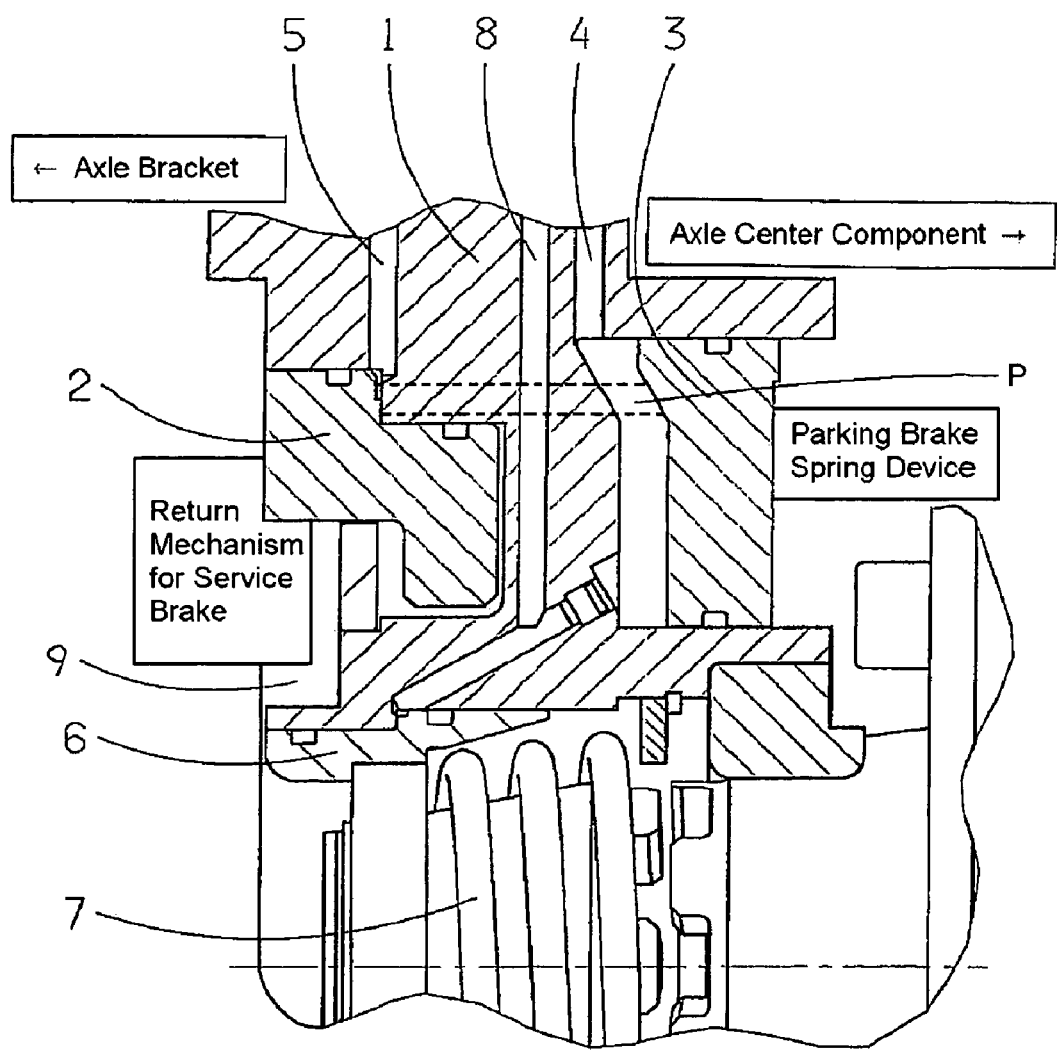
FIG. 1 is a schematic sectional view of a configuration of a brake assembly and an actuating piston of a mechanical differential lock of a drive axle, according to the invention.

With reference to FIG. 1, the brake assembly is disposed in a brake housing 1 and comprises a service brake piston 2 and a parking brake piston 3, wherein the brake housing 1 is provided between the axle bracket and axle center component. The arrangement of the brake assembly has no effect on the interfaces of the housing parts (screw assembly/centering between axle bracket and brake housing, as well as screw assembly/centering between brake housing and axle center housing), regardless of whether the drive axle comprises a mechanical differential lock.

The service brake is operated by applying oil pressure in the service brake circuit. The service brake piston 2 is hereby deflected and acts upon the brake disk assembly. For restoring the service brake piston, a return mechanism is provided. In FIG. 1, numeral 4 denotes an oil supply line for the parking brake piston 3 and numeral 5 denotes an oil supply line for the service brake piston 2. As the Figure illustrates, the configuration, according to the invention, provides sufficient space for installation 9 for the return mechanism of the service brake, which preferably comprises a spring.

In addition, the parking brake is configured as a negative brake wherein, following a pressure reduction in the parking brake oil circuit, the parking brake piston 3, actuated via a spring device comprising disk springs, acts upon the service brake piston via axially displaceable pins (shown diagrammatically as element P), disposed on the outside radius of the piston chamber so as to produce the necessary parking brake force. When pressure is applied to the parking brake piston 3 via the line 4 of the parking brake circuit, the service brake piston 2 is released, thus releasing the multi-disk brake.

According to the invention, a guide that is fixed to the housing can be implemented on the inside diameter of the brake housing 1 for the actuating device of the mechanical differential lock, which comprises a piston 6 with integrated sliding sleeve, wherein a spring 7 for returning the piston 6 is, likewise, supported in this inside diameter. According to the invention, an oil supply line 8 for operating the piston 6 of the actuating device for the mechanical differential lock extends in a bridge between the parking brake piston 3 and the service brake piston 2.

Figure 2:
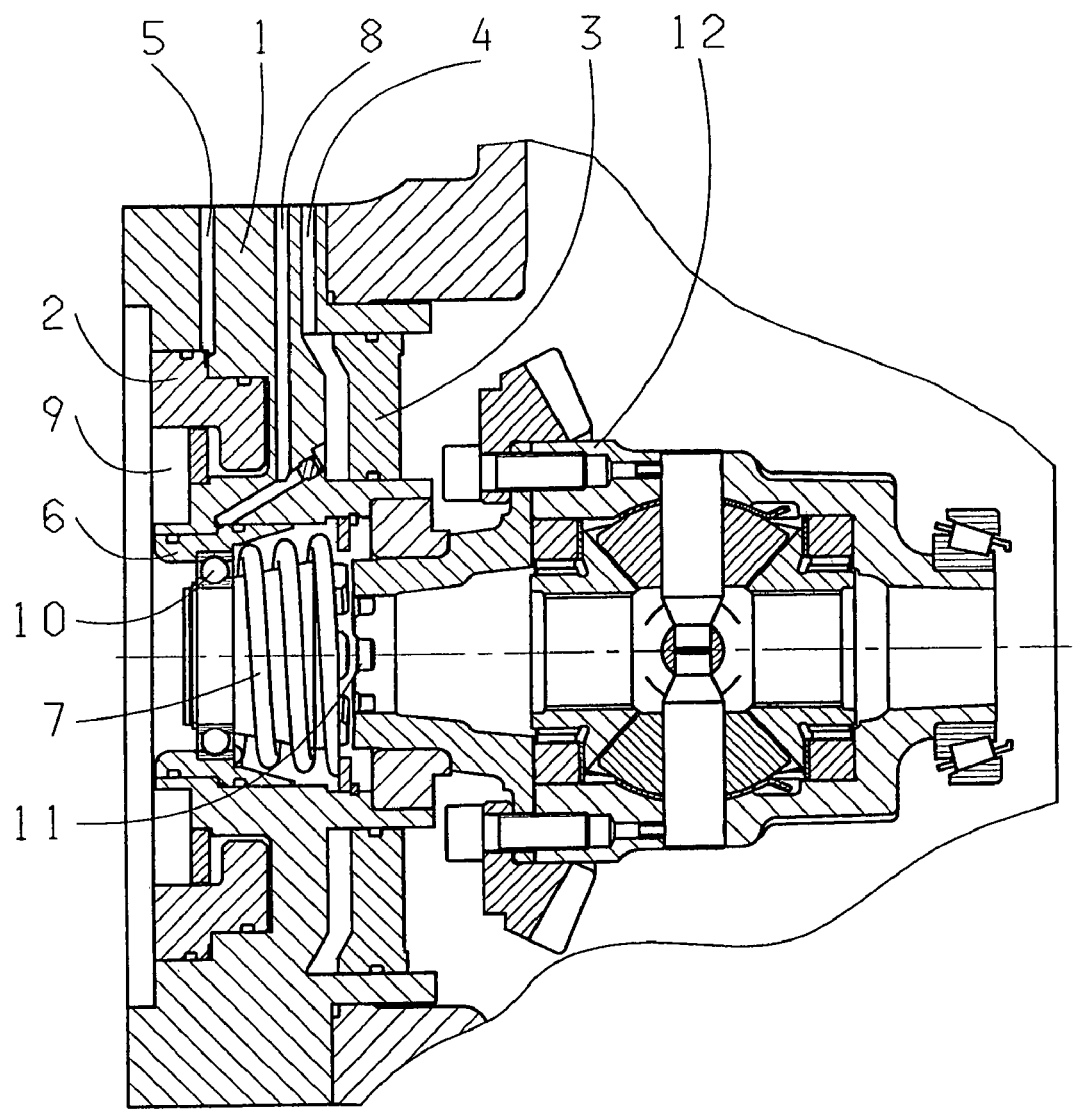
FIG. 2 is a schematic sectional view of the configuration of the brake assembly and the mechanical differential lock inside the drive axle, according to the invention.

FIG. 2 illustrates the configuration of the mechanical differential lock and brake assembly. In the example illustrated, the displacement force of the piston 6 of the actuating device for the mechanical differential lock is transmitted to the sliding sleeve of a clutch 11, via a mount 10, so as to lock the differential. A differential cage has been labeled with reference numeral 12.

Of course, any design configuration, particularly any spatial configuration of the components of the brake assembly, and the actuating device for the mechanical differential lock as such, as well as in relation to each other, to the extent they are technically feasible, falls under the scope of protection of the present claims, without influencing the function of the brake assembly and of the mechanical differential lock as described in the claims, even if these embodiments are not explicitly illustrated in the Figures or mentioned in the description.

REFERENCE NUMERALS 1 brake housing
2 service brake piston
3 parking brake piston
4 oil supply line for the parking brake piston
5 oil supply line for the service brake piston
6 actuating piston of the mechanical differential lock
7 spring for restoring the actuating piston 6
8 oil supply line for the actuating piston 6
9 space for installation for the return mechanism of the service brake
10 mount
11 clutch
12 differential cage

The invention claimed is:

1. A modular brake assembly for a drive axle comprising:
a multi-disk brake having
a service brake element (2) and
a parking brake element (3),
the modular brake assembly being located in a brake housing (1) axially between an axle bracket and an axle center component,
a guide being supported within the brake housing (1) on an inside diameter of the brake housing (1), and
the guide comprising a device (6) for actuating and locking a mechanical differential lock and a return spring (7) for deactivating and unlocking the mechanical differential lock,
an oil supply line (8) for supplying fluid to the device (6) for actuating the mechanical differential lock, and the oil supply line (8) extending through a bridge of the brake housing (1) located between the service brake element (2) and the parking brake element (3).

2. The modular brake assembly for a drive axle according to claim 1, wherein the actuating device (6) for the mechanical differential lock further comprises a coaxially piston (6) and a sliding sleeve of a form-fit clutch (11), the sliding sleeve is actuated by the piston (6), against a force of the return spring (7), and the return spring (7) is supported within the brake housing (1).

3. The modular brake assembly for a drive axle according to claim 1, wherein a service brake piston (2) acts upon the multi-disk brake by application of pressure and a return mechanism returns the service brake piston (2) to an inoperative position, during a reduction in pressure in a parking brake circuit, a spring device biases the parking brake piston (3) toward the service brake piston (2) via axially displaceable pins disposed on an outer radius of a piston chamber to engage the service brake piston (2), and the service brake piston (2) is released, via a parking brake circuit of the service brake piston (2), when pressure is applied to the parking brake circuit.

4. The modular brake assembly for a drive axle according to claim 2, wherein a displacing force of the piston (6), of the actuating device for the mechanical differential lock, is transmitted to the sliding sleeve via a mount (10) coupling the piston (6) to the return spring (7).

5. A modular brake assembly for a drive axle comprising:
a multi-disk brake comprising:
a service brake element (2), and
a parking brake element (3),
the modular brake assembly being located in a brake housing (1) axially between an axle bracket and an axle center component;
a piston (6) being supported within a bore of the brake housing (1) for actuating and locking a mechanical differential lock, and a return spring (7) being supported within a bore of the brake housing (1) for deactivating and unlocking the mechanical differential lock; and
an oil supply line (8), for supplying fluid to the piston (6), extending within the brake housing (1) between the service brake element (2) and the parking brake element (3).

6. The modular brake assembly for a drive axle according to claim 5, wherein a service brake piston (2) acts upon the multi-disk brake by application of pressure and a return mechanism returns the service brake piston (2) to an inoperative position, during a reduction in pressure in a parking brake circuit, a spring device biases the parking brake piston (3) toward the service brake piston (2) via axially displaceable pins disposed on an outer radius of a piston chamber for engaging the service brake piston (2), and the service brake piston (2) is released, via a parking brake circuit of the service brake piston (2), when pressure is applied to the parking brake circuit.

7. The modular brake assembly for a drive axle according to claim 5, wherein a displacing force of the piston (6), of the actuating device for the mechanical differential lock, is transmitted to the sliding sleeve via a mount (10) couples the piston (6) to the return spring (7).

8. A modular brake assembly for a drive axle comprising:
a multi-disk brake comprising:
a service brake element (2),
a parking brake element (3), and
a bridge of a brake housing separating the service brake element (2) from the parking brake element (3);
the modular brake assembly being located in the brake housing (1) axially between an axle bracket and an axle center component;
a piston (6) being supported within a bore of the brake housing (1) for actuating and locking a mechanical differential lock, and a return spring (7) being supported within a bore of the brake housing (1) for deactivating and unlocking the mechanical differential lock;
an oil supply line (8), for supplying fluid to the piston (6), extending within the bridge of the brake housing (1) located between the service brake element (2) and the parking brake element (3); and
the return spring (7) being located radially inward of and axially between the service brake element (2) from the parking brake element (3).

9. The modular brake assembly for a drive axle according to claim 8, wherein a service brake piston (2) acts upon the multi-disk brake by application of pressure and a return mechanism returns the service brake piston (2) to an inoperative position, during a reduction in pressure in a parking brake circuit, a spring device biases the parking brake piston (3) toward the service brake piston (2) via axially displaceable pins disposed on an outer radius of a piston chamber for engaging the service brake piston (2), and the service brake piston (2) is released, via a parking brake circuit of the service brake piston (2), when pressure is applied to the parking brake circuit.

10. The modular brake assembly for a drive axle according to claim 8, wherein a displacing force of the piston (6), of the actuating device for the mechanical differential lock, is transmitted to the sliding sleeve via a mount (10) couples the piston (6) to the return spring (7).

* * * * *